(12) United States Patent
Liang et al.

(10) Patent No.: US 6,388,874 B1
(45) Date of Patent: May 14, 2002

(54) SECURING DEVICE OF COMPUTER DATA STORAGE

(75) Inventors: Pouch Liang, Taipei; Hsuan-Tsung Chen, Tao-Yuan, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/429,116

(22) Filed: Oct. 27, 1999

(30) Foreign Application Priority Data

Apr. 20, 1999 (TW) .......................................... 88206062

(51) Int. Cl.7 ................................................ G06F 1/16
(52) U.S. Cl. ...................... 361/685; 361/677; 361/683; 361/684; 361/686; 361/724; 361/725; 361/726; 361/727; 312/232.1; 312/223.2; 312/223.3; 312/334.16; 439/377; 439/354
(58) Field of Search ........................ 361/679, 683–686, 361/724–727; 312/223.1, 223.2, 334.16; 439/377, 354

(56) References Cited

U.S. PATENT DOCUMENTS 5,332,306 A * 7/1994 Babb et al. ............ 312/334.16
6,122,173 A * 9/2000 Felcman et al. ............ 361/726

* cited by examiner

*Primary Examiner*—Gerald Tolin
*Assistant Examiner*—Yean-Hsi Chang
(74) *Attorney, Agent, or Firm*—Wei Te Chung

(57) ABSTRACT

A device for securing a computer data storage device in a computer enclosure includes a support frame having a top wall for supporting the data storage device and two side walls for supporting the support frame in the enclosure. Aligned openings are defined in the side walls for movably receiving a control bar therein with the control bar being movable between a released position and a locked position. Elongate slots are defined in the top wall extending in a direction normal to the moving direction of the control bar for receiving projections mounted to the data storage device. The control bar has a bottom section and at least a front section. Notches are defined in the front section through which the projections pass when the control bar is at the released position. Stop walls are formed on the bottom section offset from the notches a predetermined distance for engaging with the projections of the data storage device when the control bar is moved to the locked position. A resilient tab is formed on the top wall of the support frame and is resiliently biased to engage with are opening defined in the control bar for retaining the control bar at the locked position. Stroke limiting elements are formed on opposite ends of the control bar to limit the stroke of the control bar and prevent the control bar from being detached from the support frame.

20 Claims, 6 Drawing Sheets

SECURING DEVICE OF COMPUTER DATA STORAGE

BACKGROUND OF THE INVENTION

1. Field of the Invention

The present invention generally relates to a device for securing computer data storage in a computer enclosure, and in particular to a securing device of computer data storage that allows ready and efficient mounting/dismounting of the data storage.

2. The Prior Art

A computer comprises data storage devices, such as hard disk drive, floppy disk drive and CD-ROM for storage of data. Conventionally, the data storage devices are fixed in a computer enclosure by bolts. Thus, it requires tools to tighten and loosen the bolts. The tightening/loosening operation is laborious and time-consuming.

Improvements for efficiently mounting/dismounting computer data storage have been made. An example is that disclosed in Taiwan Patent Application No. 81207129. Rails are mounted on opposite walls of a disk drive rack for quickly positioning a disk drive into the disk drive rack. However, bolts are still required for securing the disk drive in the disk drive rack. Another improvement is disclosed in Taiwan Patent Application No. 78201813 in which catches are formed on opposite sides of a disk drive for engaging with corresponding slots defined in side walls of a disk drive rack to retain the disk drive in the rack. However, bolts are required to secure the catches to the disk drive.

Similar techniques are disclosed in Taiwan Patent Application Nos. 79209891, 82202204 and 82207667 and U.S. Pat. Nos. 5,262,923 and 5,510,955. All these prior art techniques suffice the inconvenience of using bolts to securing parts thereof.

It is thus desired to provide a device for securing a computer data storage device that overcomes the above problems.

SUMMARY OF THE INVENTION

Accordingly, an object of the present invention is to provide a device for efficiently mounting/dismounting a computer data storage device.

Another object of the present invention is to provide a device for securing a computer data storage device without using a tool.

A further object of the present invention is to provide a device having a simple structure for efficiently securing a computer data storage device.

To achieve the above objects, a securing device in accordance with the present invention that secures a computer data storage device in a computer enclosure comprises a support frame having a top wall for supporting the data storage device and two side walls for supporting the support frame in the enclosure. Aligned openings are defined in the side walls for movably receiving a control bar therein with the control bar being movable between a released position and a locked position. Elongate slots are defined in the top wall extending in a direction normal to the moving direction of the control bar for receiving projections mounted to the data storage device. The control bar has a bottom section and at least a front section. Notches are defined in the front section through which the projections pass when the control bar is at the released position. Stop walls are formed on the bottom section offset from the notches a predetermined distance for engaging with the projections of the data storage device when the control bar is moved to the locked position. A resilient tab is formed on the top wall of the support frame and is resiliently biased to engage with an opening defined in the control bar for retaining the control bar at the locked position. Stroke limiting elements are formed on opposite ends of the control bar to limit the stroke of the control bar and prevent the control bar from being detached from the support frame.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
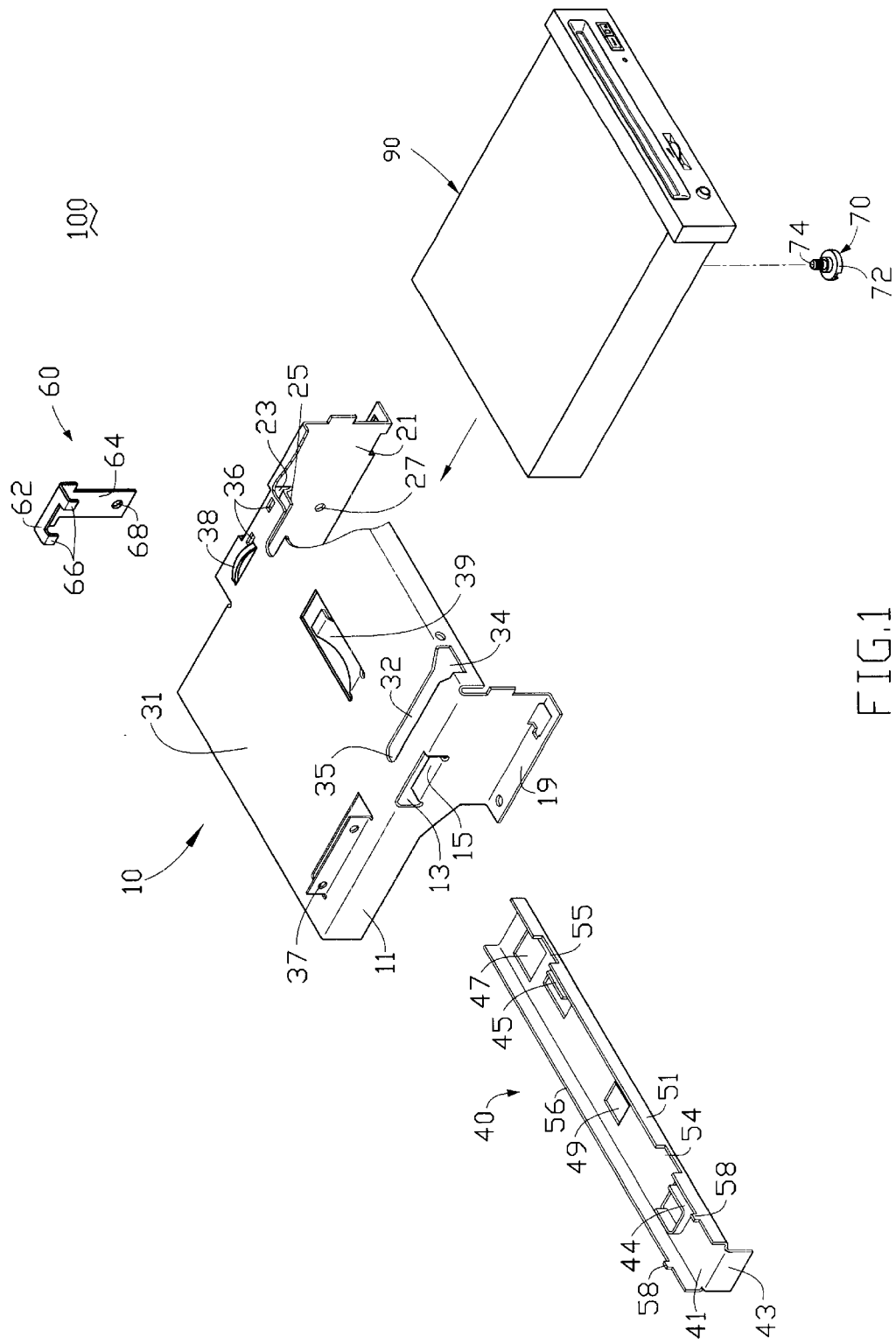
FIG. 1 is an exploded view of a securing device constructed in accordance with the present invention for mounting a data storage device in a computer enclosure.
Figure 2:
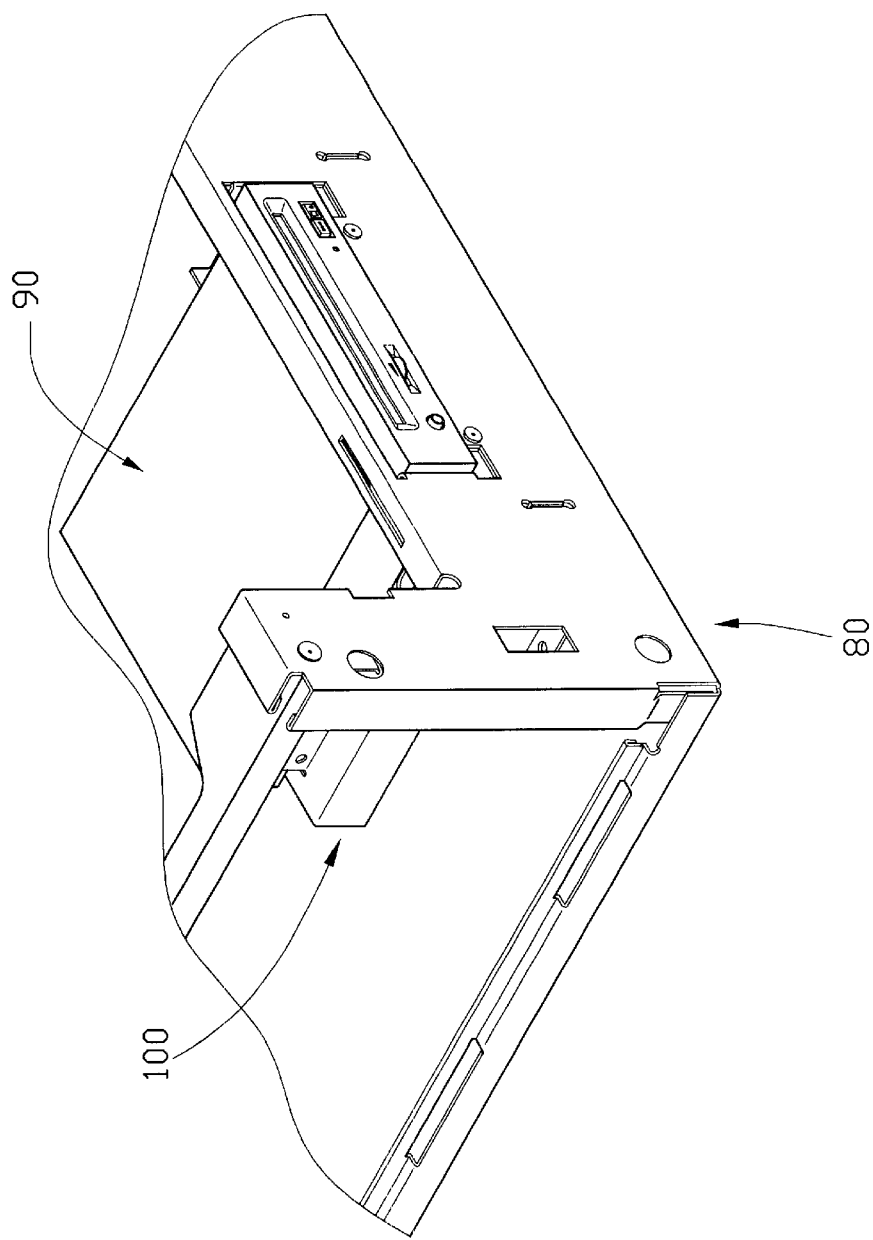
FIG. 2 is a perspective view of a portion of a computer in which the securing device secures the data storage device.
Figure 3:
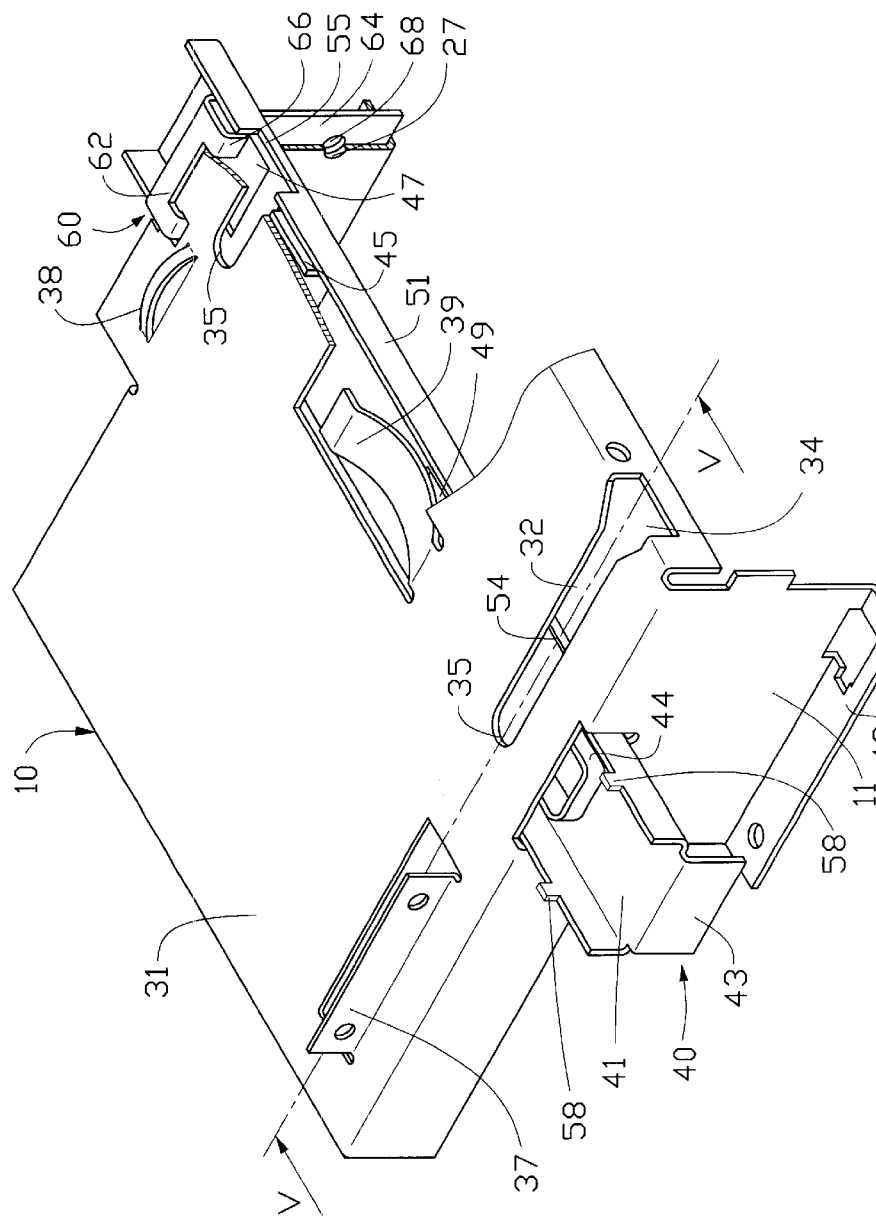
FIG. 3 is a perspective view of the securing device at a released position, a portion thereof being cut away to show inside details.

Referring to the drawings and in particular to FIGS. 1–3, the present invention is related to a securing device, generally designated by reference numeral 100, for securing a computer data storage device, such as a floppy disk drive, a hard disk drive and a compact disk read only memory (CD-ROM) 90, in a computer enclosure 80. For simplification, a CD-ROM will be taken as an example of the data storage device 90 in the following description. However, it is to be understood that the following description is also applicable to a floppy disk drive and a hard disk drive or other computer data storage devices.

The securing device 100 comprises a support frame 10 having a top wall 31 on which the CD-ROM 90 is supported and releasably secured. Two spaced, opposite side walls 11, 21 extend from opposite edges of the top wall 31 for supporting the support frame 10 in the computer enclosure 80. Mounting flanges 19 are formed on the side walls 11, 21 for fixing the securing device 100 to the computer enclosure 80. Means 37, 38 are also formed on the top wall 31 for properly positioning and supporting the CD-ROM 90 on the top wall 31.

Figure 4:
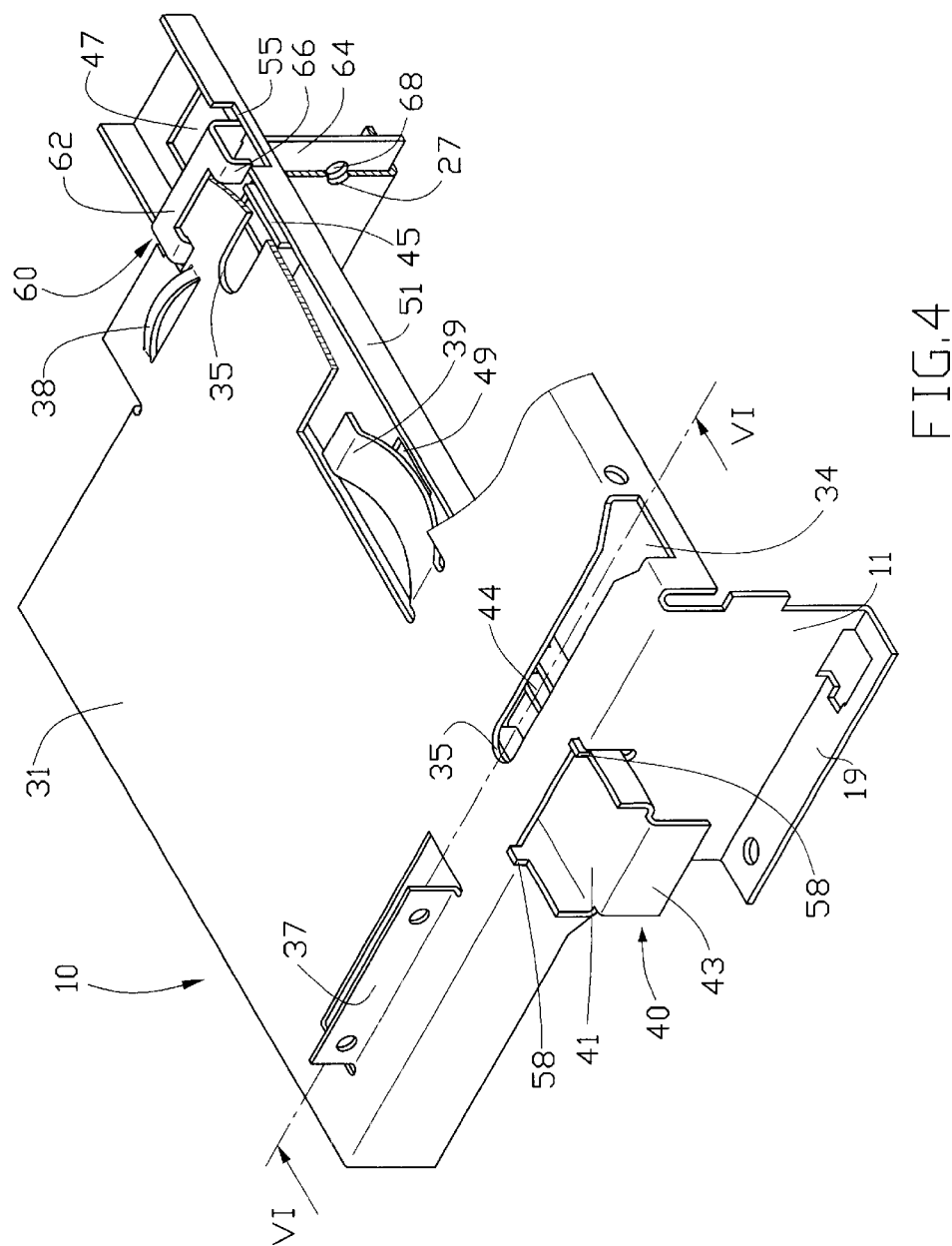
FIG. 4 is similar to FIG. 3 but showing the securing device at a locked position.
Figure 5:
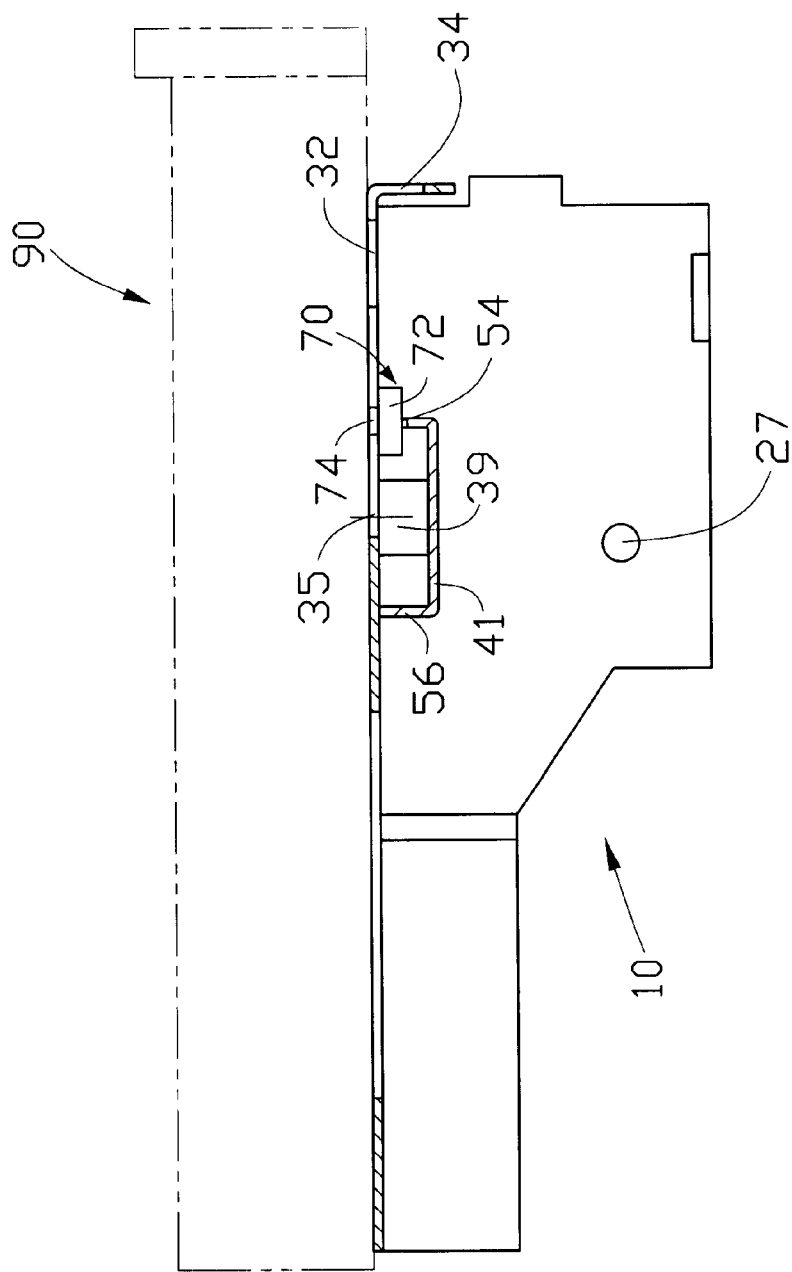
FIG. 5 is a cross-sectional view taken along line V—V of FIG. 3.

Aligned openings 13, 23 are defined in the side walls 11, 21 for receiving a control bar 40 whereby the control bar 40 is movable with respect to the support frame 10 between a released position (FIGS. 3 and 5) and a locked position (FIGS. 4 and 6) in a lateral direction of the support frame 10. Preferably, a support tab 15, 25 is formed under each opening 13, 23 for stably supporting the control bar 40. The support tabs 15, 25 may be formed by stamping the side walls 11, 21 as shown in the drawings.

Two elongate slots 32 are defined in the top wall 31 extending in a longitudinal direction substantially normal to the lateral direction and are exposed to a front edge (not labeled) thereof with diverging openings 34 defined in the front edge of the top wall 31. The slots 32 terminate at rounded inner ends 35. A resilient arc tab 39 is formed on the top wall 31 and biased by the resiliency thereof toward and contacting the control bar 40.

The control bar 40 comprises an elongate channel defined by a bottom section 41 and front and rear side sections 51, 56 extending from the bottom section 41. Two stop walls 44, 45 are formed on the bottom section 41 corresponding to the slots 32 of the top wall 31 of the support frame 10. Two notches 54, 55 are defined in the front side section 51 corresponding to the slots 32. The notches 54, 55 are offset a predetermined distance from the corresponding stop walls 44, 45. An opening 49 is defined in the bottom section 41 corresponding to the resilient arc tab 39 of the support frame 10.

In the released position, the notches 54, 55 of the front side section 51 of the control bar 40 are substantially aligned with the slots 32 of the top wall 31 of the support frame 10 whereby projections 70 mounted to the CD-ROM 90 may be received in the slots 32 and moved to the inner ends 35 thereof through the notches 54, 55 with the arc tab 39 being in slidable engagement with the bottom section 41 of the control bar 40.

When the control bar 40 is moved to the locked position, the stop walls 44, 45 of the control bar 40 are moved to substantially align with the projections 70 whereby the stop walls 44, 45 are engageable with the projections 70 for preventing the CD-ROM 90 from being moved out of the slots 32. Preferably, at least one of the stop walls 44, 45 is formed as a U-shape for more securely confining the corresponding projection 70 of the CD-ROM 90 therein. In the locked position, the arc tab 39 is aligned with and biased into engagement with the opening 49 of the control bar 40 thereby retaining the control bar 40 in the locked position.

Preferably, the projections 70 each have an expanded end 72 having a diameter greater than width of the corresponding slot 32 of the support frame 10 for preventing the CD-ROM 90 from being separated from the support frame 10 in a direction substantially normal to the top wall 31 of the support frame 10. An example of the projections 70 is bolts having a threaded post 74 engaging with corresponding inner-threaded hole (not shown) defined in an underside surface of the CD-ROM 90. The threaded post 74 has a free end on which an expanded portion 72 is formed.

Figure 6:
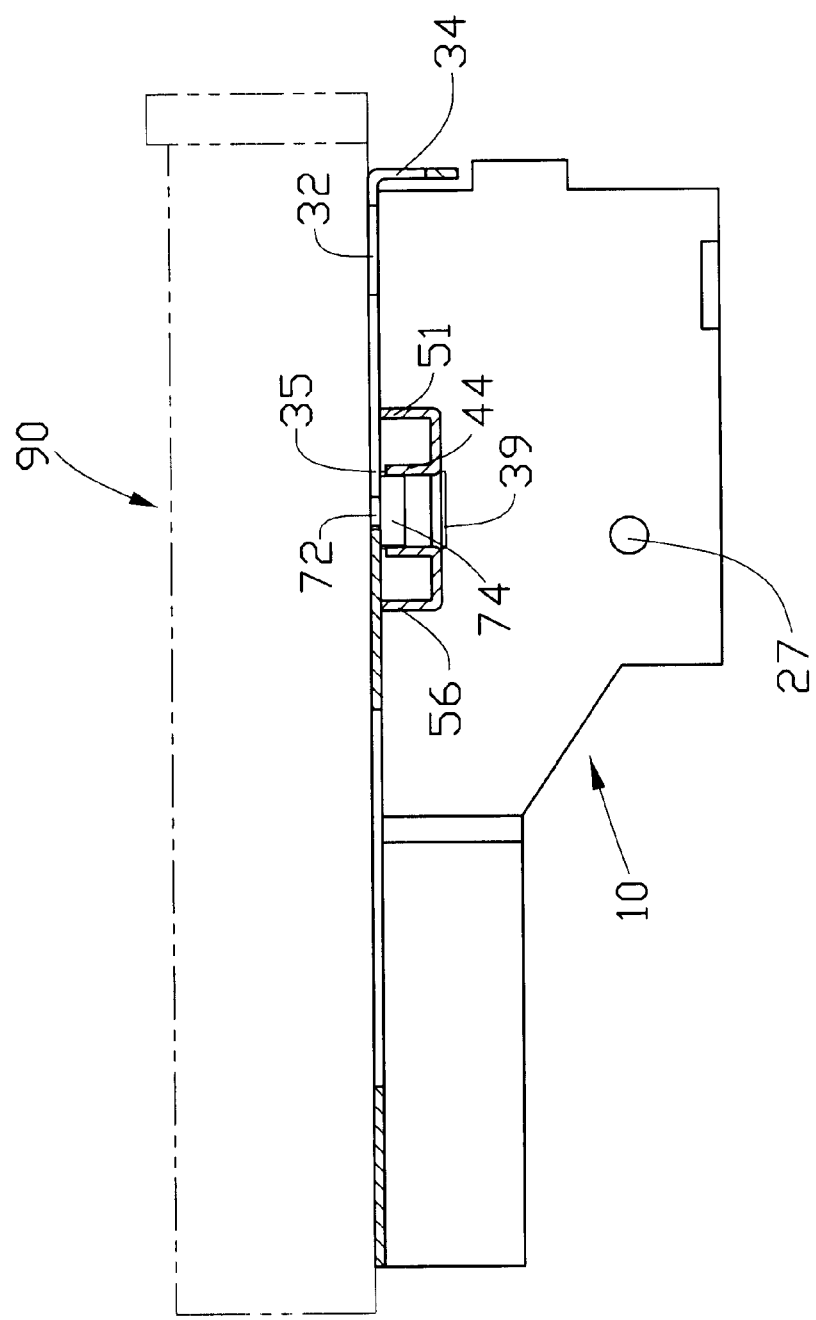
FIG. 6 is a cross-sectional view taken along line VI—VI of FIG. 4.

In addition, the width of the slots 32 is substantially corresponding to or slightly greater than a diameter of the posts 74 whereby the posts 74 are allowed to move along the slots 32 but are constrained to move in the lateral direction by opposite edges of the corresponding slots 32. Furthermore, preferably, the diameter of the expanded end 72 of the projection 70 substantially corresponds to width between the side limbs of the U-shaped stop wall 44 whereby the expanded end 72 may be snugly received therebetween as shown in FIG. 6.

An elongate positioning slot 47 is defined in the bottom section 41 of the control bar 40 proximate one end of the control bar 40 for movably receiving a fixing plate 60. The fixing plate 60 has a lower portion 64 extending through the positioning slot 47 and fixed to the side wall 21 of the support frame 10 by a bolt or rivet (not shown) received in holes 68, 27 defined in the lower portion 64 of the fixing plate 60 and the side wall 21 of the support frame 10. Preferably, the fixing plate 60 has an upper portion 62 substantially normal to the lower portion 64 and extending over the top wall 31. A pair of projections 66 extends from the upper portion 62 and engages with corresponding openings 36 defined in the top wall 31 for attaching the upper portion 62 to the top wall 31. The positioning slot 47 is dimensioned to allow the control bar 40 to move with respect to the fixing plate 60, while the fixing plate 60 provides a constraint to the movement of the control bar 40 in a direction from the side wall 21 toward the side wall 11. A projection 58 is formed on each side section 51, 56 of the control bar 40 for engaging with the top wall 31 when the control bar 40 is moved in a direction from the side wall 11 toward the side wall 21 thereby providing a constraint to the movement of the control bar 40. The fixing plate 60 and the projections 58 serve to limit the stroke of movement of the control bar 40 thereby preventing the control bar 40 from being undesirably detached from the support frame 10.

To manually move the control bar 40 between the released position and the locked position, a hand grip section 43 is formed on the control bar 40. In the embodiment illustrated, the hand grip section 43 is an extension from the bottom section 41 of the control bar 40 in a direction substantially normal thereto.

Although the present invention has been described with reference to the preferred embodiment, it is apparent to those skilled in the art that a variety of modifications and changes may be made without departing from the scope of the present invention which is intended to be defined by the appended claims. For example, the stop walls 44, 45 may be omitted and replaced by portions of the front side section 51 of the control bar 40 for preventing the CD-ROM 90 from being withdrawn when it is at the locked position. Furthermore, the resilient arc tab 39 of the support frame 10 may be replaced by spring biased element or members that are otherwise biased for engaging with the control bar 40 to retain the control bar 40 at the locked position.

What is claimed is:

1. A device for securing a computer data storage device in a computer enclosure comprising:

a support frame adapted to be fixed in the enclosure for supporting the data storage device thereon, the support frame comprising a top wall above which the data storage device is positioned and two side walls depending from the top wall for supporting the support frame in the computer enclosure, aligned openings being respectively defined in the side walls;

projections adapted to be mounted to a bottom of the data storage device; and a control bar movably extending through said aligned openings of the side walls of the support frame to be movable between a released position and a locked position, notches being defined in the control bar through which the corresponding projections pass when the control bar is at the released position, first retention means being formed on the control bar for retaining the projections and thus securing the data storage device in position when the control bar is at the locked position.

2. The device as claimed in claim 1, wherein support frame comprises a top wall on which the data storage device is positioned and two side walls extending from the top wall for supporting the support frame in the computer enclosure, aligned openings being defined in the side walls for movably receiving the control bar.

3. The device as claimed in claim 1 further comprising second retention means for retaining the control bar at the locked position.

4. The device as claimed in claim 1, wherein a resiliently biased member is formed on the top wall of the support frame for engaging with an opening defined in the control bar when the control bar is at the locked position thereby retaining the control bar at the locked position.

5. The device as claimed in claim 4, wherein the resiliently biased member comprises an arc tab formed on the top wall and resiliently biased to engage with the control bar.

6. The device as claimed in claim 1, wherein a support tab extends from the opening of each side wall for stably supporting the control bar.

7. The device as claimed in claim 1, wherein the support frame comprises a top wall in which elongate slots are defined, the slots being exposed to a front edge of the top wall for receiving the projections of the data storage device.

8. The device as claimed in claim 7, wherein the control bar is movably supported under the top wall and comprises a bottom section and a front side section, the notches being defined in the front side section and corresponding to the slots of the top wall whereby when the control bar is at the released position, the projections of the data storage device are allowed to pass through the notches of the control bar and when the control bar is moved to the locked position, the projections are retained by the first retention means.

9. The device as claimed in claim 8, wherein the first retention means comprises stop walls formed on the control bar for engaging with the projections of the data storage device to prevent the data storage device from being withdrawn from the slots of the top wall when the control bar is at the locked position.

10. The device as claimed in claim 9, wherein at least one of the stop walls is U-shaped having opposite and spaced side limbs for receiving the corresponding projection therebetween.

11. The device as claimed in claim 7, wherein each slot of the top wall has a diverging opening defined in the front edge of the top wall.

12. The device as claimed in claim 7, wherein each projection mounted to the data storage device comprises a post having a first diameter extending from the data storage device and forming an expanded end having a second diameter greater than the first diameter, the slots of the top wall having a width substantially corresponding to the first diameter for guiding the movement of the data storage device along the slots and preventing the data storage device from being separated from the support frame in a direction substantially normal to the top wall.

13. The device as claimed in claim 12, wherein each projection of the data storage device comprises a bolt having a threaded post engaging with an inner-threaded hole defined in the data storage device and an expanded free end.

14. The device as claimed in claim 1, wherein the control bar comprises a bottom section and two side sections extending from the bottom section, a projection being formed on each side section for engaging with the top wall thereby constraining the movement of the control bar in a first direction, an opening being defined in the bottom section of the control bar for movably receiving a fixing plate that is fixed to support frame whereby when the control bar is moved in an opposite second direction, the fixing plate engages with the opening thereby constraining the movement of the control bar in the second position.

15. The device as claimed in claim 14, wherein the fixing plate comprises a portion extending over the top wall and forming projections engaging with openings defined in the top wall for attaching the fixing plate to the support frame.

16. The device as claimed in claim 14, wherein aligned holes are defined in the fixing plate and a corresponding portion of the support frame for receiving a fastener that secures the fixing plate to the support frame.

17. The device as claimed in claim 1, wherein the control bar comprises a hand gripping section for being gripped by a user to move the control bar.

18. A computer enclosure comprising a chassis in which a securing device is mounted adapted to releasably secure a data storage device to the chassis, the securing device comprising:

a support frame fixed in the chassis adapted to support the data storage device thereon, the support frame comprising a top wall above which the data storage device is positioned;

projections adapted to be mounted to the data storage device; and a control bar movably attached below the top wall of the support frame to be movable between a released position and a locked position, notches being defined in the control bar through which the corresponding projections pass when the control bar is at the released position, first retention means being formed on the control bar for retaining the projections and thus securing the data storage device in position when the control bar is at the locked position.

19. The computer enclosure as claimed in claim 18, wherein elongate slots are defined in the top wall and exposed to a front edge of the top wall for receiving the projections of the data storage device.

20. An enclosure assembly comprising:

a chassis;

a support frame fixed to said chassis and including a top wall with therein at least a slot in a front-to-back direction;

a data storage device attached to said support frame until being completely seated atop said top wall with a projection formed on a bottom surface thereof and moving along and extending through said slot so as to restrain movement of the data storage device with regard to the support frame in a horizontal side-to-side direction, said projection forming an expanded end cooperating with the bottom surface of the data storage to sandwich the supporting wall therebetween so as to restrain movement of the data storage device with regard to the support frame in an up-and-down direction; and a control bar slidably, with a limited range, attached under the top wall of the support frame along said side-to-side direction and defining a retention means thereof; wherein when said control bar is at a released position, the data storage device is allowed to be moved with regard to the support frame in said front-to-back direction; when the control bar is at a locked position, said retention means restrains movement of the data storage device with regard to the support frame in both forward and rearward directions.

* * * * *